US009311199B2

(12) United States Patent
Blood et al.

(10) Patent No.: US 9,311,199 B2
(45) Date of Patent: *Apr. 12, 2016

(54) REPLAYING JOBS AT A SECONDARY LOCATION OF A SERVICE

(71) Applicant: Microsoft Technology Licensing, LLC, Redmond, WA (US)

(72) Inventors: Daniel Blood, Snohomish, WA (US); Alexander Hopmann, Seattle, WA (US); Siddharth Rajendra Shah, Bothell, WA (US); Viktoriya Taranov, Bellevue, WA (US); Tarkan Sevilmis, Redmond, WA (US); Nikita Voronkov, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/488,633

(22) Filed: Sep. 17, 2014

(65) Prior Publication Data
US 2015/0039931 A1 Feb. 5, 2015

Related U.S. Application Data

(63) Continuation of application No. 13/151,114, filed on Jun. 1, 2011, now Pat. No. 8,850,261.

(51) Int. Cl.
*G06F 11/00* (2006.01)
*G06F 11/20* (2006.01)
(Continued)

(52) U.S. Cl.
CPC ............... *G06F 11/203* (2013.01); *G06F 9/06* (2013.01); *G06F 11/00* (2013.01);
(Continued)

(58) Field of Classification Search
CPC ............ G06F 11/2097; G06F 11/2038; G06F 11/2046; G06F 11/2033; G06F 11/203
See application file for complete search history.

(56) References Cited

U.S. PATENT DOCUMENTS 6,820,218 B1 11/2004 Barga et al.
7,100,070 B2 8/2006 Iwamura et al.
(Continued)

FOREIGN PATENT DOCUMENTS

WO WO 2004/102535 11/2004

OTHER PUBLICATIONS

European Communication and Search Report in Application 12793097.2, mailed Dec. 18, 2014, 6 pgs.
European Communication and Search Report in Application 12796250.4, mailed Nov. 21, 2014, 6 pgs.
(Continued)

*Primary Examiner* — Charles Ehne
(74) *Attorney, Agent, or Firm* — Thomas Wong; Danielle Johnston-Holmes; Micky Minhas

(57) ABSTRACT

Jobs submitted to a primary location of a service within a period of time before and/or after a fail-over event are determined and are resubmitted to a secondary location of the service. For example, jobs that are submitted fifteen minutes before the fail-over event and jobs that are submitted to the primary network before the fail-over to the second location is completed are resubmitted at the secondary location. After the fail-over event occurs, the jobs are updated with the secondary network that is taking the place of the primary location of the service. A mapping of job input parameters (e.g. identifiers and/or secrets) from the primary location to the secondary location are used by the jobs when they are resubmitted to the secondary location. Each job determines what changes are to be made to the job request based on the job being resubmitted.

20 Claims, 5 Drawing Sheets

(51) Int. Cl.
*G06F 9/06* (2006.01)
*G06F 17/30* (2006.01)

(52) U.S. Cl.
CPC ....... *G06F 11/2025* (2013.01); *G06F 11/2033* (2013.01); *G06F 11/2038* (2013.01); *G06F 11/2046* (2013.01); *G06F 11/2097* (2013.01); *G06F 17/30* (2013.01); *G06F 2201/85* (2013.01)

(56) References Cited

U.S. PATENT DOCUMENTS

| | | | |
|---|---|---|---|
| 7,107,483 | B2 | 9/2006 | Duncan et al. |
| 7,219,260 | B1 | 5/2007 | de Forest et al. |
| 7,281,031 | B1 | 10/2007 | Wang et al. |
| 7,293,192 | B2 | 11/2007 | Allen |
| 7,383,293 | B2 | 6/2008 | Gupta et al. |
| 7,428,657 | B2 | 9/2008 | Yamasaki |
| 7,437,609 | B2 | 10/2008 | Anderson et al. |
| 7,475,285 | B2 | 1/2009 | Wang et al. |
| 7,549,079 | B2 | 6/2009 | Connolly |
| 7,617,369 | B1 | 11/2009 | Bezbaruah et al. |
| 7,627,687 | B2 | 12/2009 | Ahal |
| 7,634,679 | B2 | 12/2009 | Quintiliano |
| 7,668,962 | B2 | 2/2010 | Tran |
| 7,685,179 | B2 | 3/2010 | MacCormick |
| 7,779,298 | B2 | 8/2010 | Challenger et al. |
| 7,793,141 | B1 | 9/2010 | Miller |
| 7,844,851 | B2 | 11/2010 | Cosmadopoulos et al. |
| 7,869,373 | B2 | 1/2011 | Lundstrom et al. |
| 8,255,739 | B1* | 8/2012 | Chatterjee et al. ............. 714/6.1 |
| 8,850,261 | B2 | 9/2014 | Blood |
| 2004/0158766 | A1 | 8/2004 | Liccione |
| 2004/0172574 | A1 | 9/2004 | Wing et al. |
| 2005/0149528 | A1 | 7/2005 | Anderson |
| 2006/0179083 | A1 | 8/2006 | Kulkarni |
| 2007/0016617 | A1 | 1/2007 | Lomet |
| 2007/0168692 | A1* | 7/2007 | Quintiliano ....................... 714/4 |
| 2007/0256081 | A1 | 11/2007 | Comer |
| 2008/0253283 | A1 | 10/2008 | Douglis et al. |
| 2009/0006884 | A1 | 1/2009 | Cahill |
| 2009/0006888 | A1 | 1/2009 | Bernhard et al. |
| 2009/0094478 | A1* | 4/2009 | Harper et al. ..................... 714/3 |
| 2009/0119536 | A1 | 5/2009 | Guo |
| 2009/0271655 | A1 | 10/2009 | Hotta |
| 2009/0313311 | A1 | 12/2009 | Hoffmann et al. |
| 2009/0327442 | A1 | 12/2009 | Rosenfelt |
| 2010/0031078 | A1 | 2/2010 | Foote |
| 2010/0191884 | A1 | 7/2010 | Holenstein et al. |
| 2011/0022879 | A1 | 1/2011 | Chavda et al. |
| 2011/0047413 | A1 | 2/2011 | McGill |
| 2011/0099147 | A1 | 4/2011 | McAlister |
| 2012/0310887 | A1 | 12/2012 | Taranov |
| 2012/0311375 | A1 | 12/2012 | Shah |
| 2012/0311377 | A1 | 12/2012 | Blood |

OTHER PUBLICATIONS

European Official Communication in Application 12796250.4, mailed Dec. 9, 2014, 1 pg.
Limaye, K., et al.; "*Job-Site Level Fault Tolerance for Cluster and Grid environments*"; Sep. 2005; accessed Mar. 8, 2011 at http://ieeexplore.ieee.org/stamp/stamp.jsp?tp=&arnumber=4154086; 9 pgs.
Microsoft | TechNet; "*Configure disaster recovery across SharePoint farms by using SQL Server log shipping*"; May 21, 2009; accessed Mar. 10, 2011 at http://technet.microsoft.com/en-us/library/dd890507(office.12).aspx; 21 pgs.
MSDN.Microsoft.com; "Read-Only Access to Secondary Availability Replicas"; © 2011 Microsoft Corporation; accessed Mar. 11, 2011; http://msdn.microsoft.com/en-us/library/ff878253(v=sql.110).aspx; 3 pgs.
Network Appliance, Inc.; "Rapid data availability and recovery with network appliance™ disaster recovery solutions"; accessed Mar. 11, 2011 at http://www.dnscoinc.com/rapiddata.pdf; 4 pgs.
Oracle Corporation; "Managing a Physical Standby Database"; © 1998, 2002 Oracle Corporation; accessed Mar. 11, 2011 at http://download.oracle.com/docs/cd/B10501_01/server.920/a96653/manage_ps.htm#1017113; 16 pgs.
Oracle; "Oracle Berkeley DB Replication for Highly Available Data Management"; accessed Mar. 11, 2011 at http://www.oracle.com/technetwork/database/berkeleydb/overview/high-availability-099050.html; 2 pgs.
Pafumi.net; "Implementing Standby DB's"; accessed Mar. 11, 2011 at http://pafumi.net/Standby_Concepts_Configuration.html#Activating_A_Standby_Database; 33 pgs.
Technet.microsoft.com; "Disaster Recovery in SharePoint Products and Technologies"; Jun. 9, 2004; accessed Mar. 11, 2011 at http://technet.microsoft.com/en-us/library/cc750142.aspx; 1 pg.
International Search Report mailed Dec. 12, 2012, in PCT/US2012/039788.
International Search Report mailed Dec. 21, 2012, in PCT/US2012/039789.
International Search Report mailed Dec. 21, 2012, in PCT/US2012/040622.
Office Action mailed Jul. 3, 2012, in U.S. Appl. No. 13/154,242.
Office Action mailed Oct. 11, 2012, in U.S. Appl. No. 13/154,242.
Office Action mailed Apr. 19, 2013, in U.S. Appl. No. 13/154,242.
Office Action mailed Jun. 3, 2013, in U.S. Appl. No. 13/151,114.
Office Action mailed Aug. 27, 2013, in U.S. Appl. No. 13/151,092.
Office Action mailed Sep. 20, 2013, in U.S. Appl. No. 13/154,242.
U.S. Appl. No. 13/151,114, Office Action mailed Nov. 29, 2013, 11 pgs.
U.S. Appl. No. 13/154,242, Amendment and Response filed Aug. 21, 2012, 11 pgs.
U.S. Appl. No. 13/154,242, Amendment and Response filed Jan. 11, 2013, 10 pgs.
U.S. Appl. No. 13/154,242, Amendment and Response filed Jul. 19, 2013, 10 pgs.
U.S. Appl. No. 13/151,114, Amendment and Response filed Oct. 3, 2013, 9 pgs.
U.S. Appl. No. 13/151,092, Amendment and Response filed Jan. 24, 2014, 9 pgs.
U.S. Appl. No. 13/151,114, Amendment and Response filed Mar. 20, 2014, 11 pgs.
U.S. Appl. No. 13/154,242, Amendment and Response filed Mar. 20, 2014, 14 pgs.
U.S. Appl. No. 13/151,114, Notice of Allowance mailed Apr. 8, 2014, 5 pgs.
U.S. Appl. No. 13/151,092, Office Action mailed Mar. 7, 2014, 13 pgs.
U.S. Appl. No. 13/151,114, Notice of Allowance mailed May 20, 2014, 2 pgs.
U.S. Appl. No. 13/151,114, Notice of Allowance mailed Jul. 1, 2014, 2 pgs.
U.S. Appl. No. 13/151,092, Amendment and Response filed Jun. 6, 2014, 11 pgs.
U.S. Appl. No. 13/151,092, Office Action mailed Jun. 26, 2014, 15 pgs.
Sproehnle, Sarah, "Basic of MySQL failover (using replication)", posted Oct. 21, 2009 at http://everythingmysql.ning.com, retrieved Jun. 19, 2014, 2 pgs.
U.S. Appl. No. 13/151,114, Notice of Allowance mailed Jul. 14, 2014, 2 pgs.
U.S. Appl. No. 13/151,114, Notice of Allowance mailed Sep. 2, 2014, 2 pgs.
U.S. Appl. No. 13/151,092, Office Action mailed Nov. 24, 2014, 15 pgs.
U.S. Appl. No. 13/151,092, Amendment and Response filed Sep. 26, 2014, 12 pgs.
U.S. Appl. No. 13/151,092, Amendment and Response filed Feb. 23, 2015, 11 pgs.
U.S. Appl. No. 13/151,092, Office Action mailed Mar. 18, 2015, 14 pgs.
Chinese 1st Office Action in Application 201280026439.0, mailed May 19, 2015, 14 pgs.
U.S. Appl. No. 13/154,242, Office Action mailed Jul. 15, 2015, 10 pgs.

* cited by examiner

REPLAYING JOBS AT A SECONDARY LOCATION OF A SERVICE

CROSS-REFERENCE TO RELATED APPLICATIONS

This application is a continuation of U.S. patent application Ser. No. 13/151,114, now U.S. Pat. No. 8,850,261, entitled "REPLAYING JOBS AT A SECONDARY LOCATION OF A SERVICE," filed on Jun. 1, 2011, which application is hereby incorporated herein by its reference.

BACKGROUND

Web-based services include files that are located on web servers along with data that is stored in databases. For example, there are a large number of servers to handle the traffic that is directed to the service. In some cases, a service may catastrophically fail causing work to be lost. Transitioning operations to a new service can be an expensive, time consuming process.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Jobs submitted to a primary location of a service within a period of time before and/or after a fail-over event are determined and are resubmitted to a secondary location of the service. For example, jobs that are submitted fifteen minutes before the fail-over event and jobs that are submitted to the primary network before the fail-over to the second location is completed are resubmitted at the secondary location. After the fail-over event occurs, the jobs are updated with the secondary network that is taking the place of the primary location of the service. A mapping of job input parameters (e.g. identifiers and/or secrets) from the primary location to the secondary location are used by the jobs when they are resubmitted to the secondary location. Each job determines what changes are to be made to the job request based on the job being resubmitted due to the occurrence of the fail-over event. For example, some jobs may determine that they do not need to be re-submitted while other jobs may simply resubmit the same job to the secondary location.

DETAILED DESCRIPTION

Figure 1:
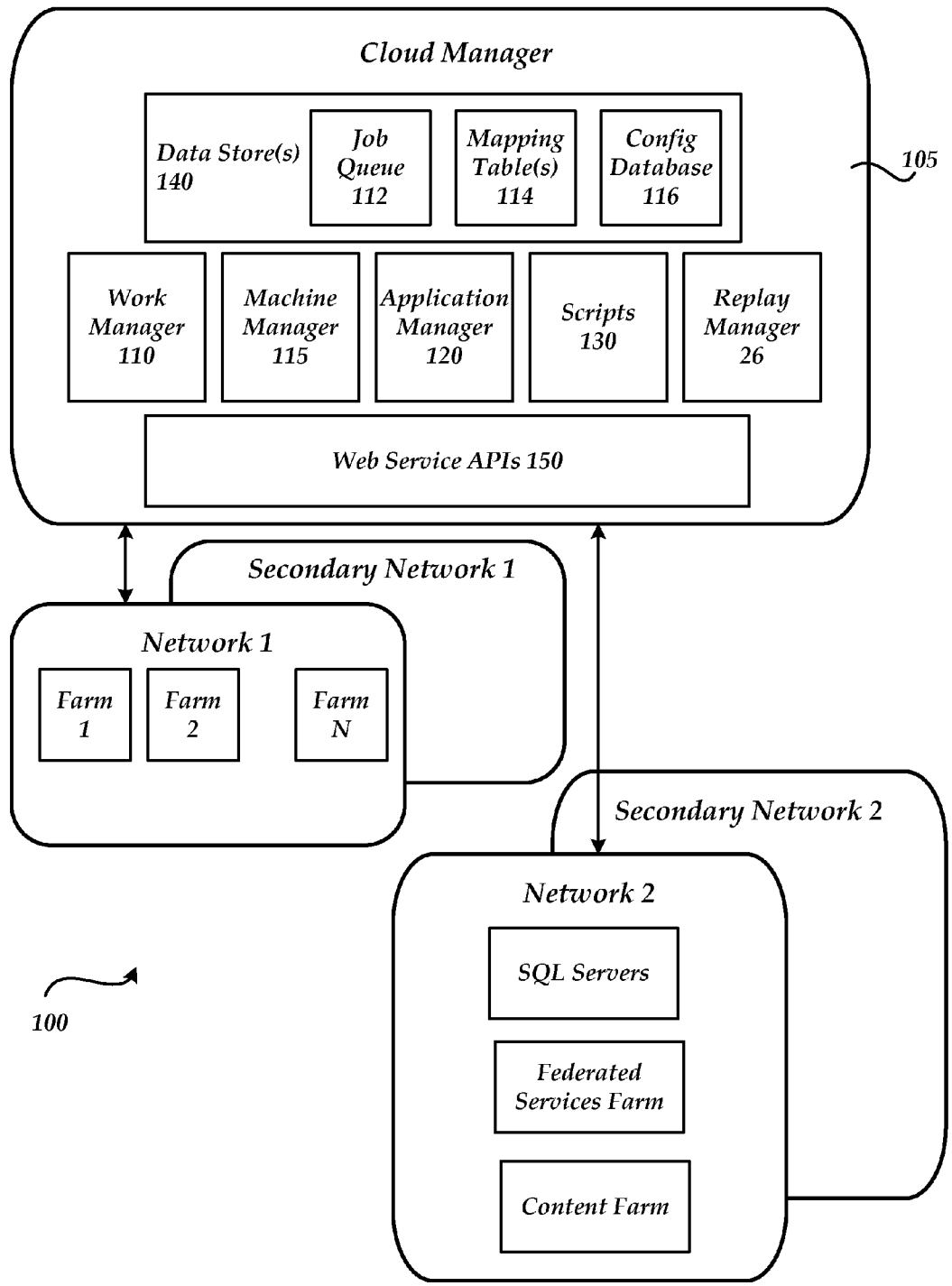
FIG. 1 illustrates a cloud management system for replaying jobs at a secondary location of a service.

Referring now to the drawings, in which like numerals represent like elements, various embodiment will be described.

Generally, program modules include routines, programs, components, data structures, and other types of structures that perform particular jobs or implement particular abstract data types. Other computer system configurations may also be used, including hand-held devices, multiprocessor systems, microprocessor-based or programmable consumer electronics, minicomputers, mainframe computers, and the like. Distributed computing environments may also be used where jobs are performed by remote processing devices that are linked through a communications network. In a distributed computing environment, program modules may be located in both local and remote memory storage devices.

FIG. 1 illustrates a cloud management system for replaying jobs at a secondary location of a service. System 100 illustrates cloud manager 105 that is connected to and manages different networks potentially distributed across the world. Each of the networks is configured to provide content services for one or more tenants (e.g. clients, customers). The networks may be hosted within a cloud service and/or in an on-premises data center. Cloud manager 105 is used in deploying, configuring and managing the networks. The cloud manager is configured to receive requests through an idempotent and asynchronous application web service application programming interface (API) 150 that can tolerate intermittent network failures.

As illustrated, cloud manager 105 comprises work manager 110, machine manager 115, application specific manager 120, scripts 130, replay manager 26 and a central repository, such as data store(s) 140 (e.g. databases). The functionality that is not included within one of the illustrated managers may reside in some other location of the cloud manager. According to one embodiment, application manager 120 is a SharePoint tenant manager that comprises SharePoint specific logic.

Generally, cloud manager 105 assists in deploying and managing networks for an online service, such as an online content management service. The cloud manager system is a central coordination service that receives requests to perform operations relating to configuring, updating and performing jobs in networks that are used in providing the online service. For example, the cloud manager may be called to manage assets within one or more of the networks (e.g. Servers, Farms, User Properties, and the like). The management of the assets may comprise deploying machines, updating machines, removing machines, performing configuration changes on servers, Virtual Machines (VMs), as well as performing other jobs relating to the management. The cloud manager is configured to provide service for attached networks even during upgrades to the cloud manager. The cloud manager is configured to receive requests through an idempotent and asynchronous application programming interface (API) that cannot rely on a reliable network.

As illustrated, Network 1 and Network 2 are live networks that are actively servicing users. Secondary Network 1 and Secondary Network 2 are secondary networks that mirror the content and configuration of the corresponding live networks. The secondary networks are not actively service users while the primary network is active. According to an embodiment, the secondary networks are kept "warm" such that the user load from the primary networks may be quickly switched to the secondary networks in case of an outage/disaster/fail-over.

The primary networks are configured to perform back-ups (full, incremental) including SQL transaction log backups that are routinely and frequently taken (e.g. at least a few times an hour). The backups from the primary networks (e.g. Network 1 and 2) are copied to the secondary networks (e.g. Secondary Network 1 and 2) after they are created. According to an embodiment, the secondary networks replay the transaction logs as they are received from the corresponding primary network. Administrative operations that occur on the live primary network are automatically replayed on the corresponding warm secondary network such that the primary network and the secondary network remain synchronized.

Work manager 110 manages the execution of jobs and enables scheduling and retry of longer running jobs. Work manager 110 starts jobs stored in job queue 112 and keeps track of running jobs. When a predetermined time has elapsed, work manager 110 may automatically cancel the task and perform some further processing relating to the task. According to one embodiment, the jobs in job queue 112 are executed by work manager 110 by invoking one or more scripts 130. For example, a scripting language such as Microsoft's PowerShell® may be used to program the jobs that are executed by work manager 110. Each script may be run as a new process. While executing each script as a new process may have a fairly high CPU overhead, this system is scalable and helps to ensure a clean environment for each script execution plus full cleanup when the script is completed.

When jobs are to be resubmitted at a secondary location (e.g. in response to a fail-over to the secondary location), work manager 110 may be used in determining the jobs that are to be resubmitted. For example, work manager 110 may determine the jobs that are submitted to performed at a primary location of a service within a time window before the fail-over event and up until the job requests are processed by the secondary location.

Machine manager 115 is configured to manage the physical machines in the networks (e.g. Network 1, Network 2, Secondary Network 1, Secondary Network 2). Generally, machine manager 115 understands Networks, Physical Machines, Virtual Machines (VMs), VM Images (VHDs), and the like. The machine manager does not have a strong binding to the specific services running within the networks but keeps track of the various components in the networks in terms of "roles." For example machine manager 115 could be requested through API 150 to deploy a VM of type "Foo" with version 12.34.56.78 on Network 2. In response to a request to cloud manager 105, machine manager 115 locates a suitable Physical Machine that is located on Network 2 and configures the VM according to the VM Image associated with the VM's Role. The physical machine is configured with a VHD of type Foo with version 12.34.56.78 that is stored within a data store, such as data store 140. A corresponding change is made to secondary network 2. The images used within the network may also be stored in other locations, such as a local data share for one or more of the networks. Scripts may be run to perform the installation of the VHD on the physical machine as well as for performing any post-deployment configuration. Machine manager 115 keeps track of the configuration of the machines each network. For example, machine manager 115 may keep track of a VM's role (type of VM), state of the VM (Provisioning, Running, Stopped, Failed), version and whether the VM exists in a given farm (which implies their network).

The configuration database 116 contains a map of each of the networks. For example, the configuration database 116 may include information relating to each of the farms, databases, site collections, and the like of a network. The configuration database 116 may include a row for each physical machine, VM, farm, and the like for each network. According to an embodiment, each VHD, Farm, and VM within a network has an associated version string.

Scripts 130 is configured to store scripts that are executed to perform work both locally for cloud manager 105 and remotely on one or more of the networks. One or more of the scripts 130 may also be stored in other locations. For example, scripts to be performed on a network (e.g. Network 1, Network 2) may be stored locally to that network. The scripts may be used for many different purposes. For example, the scripts may be used to perform configurations of machines in one or more of the networks, changing settings on previously configured machines, add a new VM, add a new database, move data from one machine to another, move tenants, change schemas, and the like. According to one embodiment, the scripts are Microsoft's PowerShell® scripts. Other programming implementations may be used. For example, a compiled and/or early-bound programming language may be used to implement the functionality. Scripting, however, is a fairly concise language to express many of the jobs that are to be performed. Programming the equivalent in a programming language, such as C#, would often require much more verbose implementations. The scripts are also late-bound, meaning that multiple versions of underlying code-bases can be targeted without having to constantly link to different interface DLLs. Using PowerShell scripts allows a process to be started locally by cloud manager 105 that may in turn start a process on a remote machine (i.e. a physical machine in one of the attached networks). Other techniques may also be used to start a process on a remote machine, such as Secure Shell (SSH) and the like. When a script is run at a primary location (e.g. Network 1), the script may also be run at the secondary location (e.g. Secondary Network 2) such that the primary and secondary locations are configured in a same manner.

Application specific information that cloud manager 105 is managing is performed by application manager 120. According to one embodiment, the application specific information relates to Microsoft SharePoint®. As such, application manager 120 is configured to know about SharePoint Tenants, Site Collections, and the like.

Each network may be configured as a dedicated network for a tenant and/or as a multi-tenant network that services more than one client. The networks may include a changing number of physical/virtual machines with their configuration also changing after deployment. According to an embodiment, the primary location and the secondary location of a service are configured in the same manner.

Generally, a network may continue to grow as long as the networking limits (e.g. load balancer and network switches) are not exceeded. For example, a network may start out with ten servers and later expand to one hundred or more servers. As the primary network changes, the corresponding secondary network is automatically changed to reflect the changes made to the primary network. The physical machines within a network may be assigned a class or type. For example, some of the machines may be compute machines (used for web front ends and app servers) and other machines may be storage machines that are provisioned with more storage than compute machines. According to an embodiment, cloud manager 105 configures the machines within a network with multiple versions of the image files. According to an embodiment, farms usually have a same version of image files.

According to one embodiment, the software limits are managed by the cloud manager system 100 within the network by virtualizing the machines and managing independently acting "Farms" inside the network. Each network may include one or more farms (e.g. see Network 1). According to one embodiment, a network is considered a single cluster of network load balanced machines that expose one or more VIP (Virtual IP) to the outside world and can route that traffic to any of the machines within the network. The machines in the network generally are tightly coupled and have minimum latencies (i.e. <1 ms ping latency).

Farms are the basic grouping of machines used to coordinate applications that need tightly bound relationships. For example, content farms may be deployed within each of the networks for a content management application, such as Microsoft SharePoint®. Generally, the set of machines in each of the farms provide web service and application server functions together. Typically, the machines inside the farm are running the same build of an application (i.e. SharePoint) and are sharing a common configuration database to serve specific tenants and site collections.

Farms can contain heterogeneous sets of virtual machines. Cloud manager 105 maintains a "farm goal" within data store 140 which is a target number of machines of each role for each farm. Some roles include Content Front End, Content Central Admin, Content Timer Service, Federated Central Admin, Federated App Server etc. For example, content farms are the basic SharePoint farm that handles incoming customer requests. Federated Services farms contain SharePoint services that can operate cross farms such as search and the profile store. Farms may be used for hosting large capacity public internet sites. Some farms may contain a group of Active Directory servers and a Provisioning Daemon. Cloud manager 105 automatically deploys and/or decommissions virtual machines in the networks to help in meeting the defined target. These farms goals may be automatically and/or manually configured. For example, the farm goals may change to respond to changes in activity and capacity needs. Network Farm—there is one network farm per Network that contains all the VM roles that scale out easily as a resource to the whole Network.

The Cloud Manager Web Service APIs 150 are designed to work in the context of a massively scalable global service. The APIs assume that any network request might fail and/or hang in transit. Calls to cloud manager 105 are configured to be idempotent. In other words, the same call may be made to cloud manager 105 multiple times (as long as the parameters are identical) without changing the outcome.

Cloud manager 105 maintains records to keep track of current requests to a service. For example, cloud manager 105 updates records in a local database and if necessary schedules a "job" to perform more lengthy activity later.

Cloud manager 105 keeps track of Images (such as Virtual Disk Images) that are the templates used to deploy new machines within a network. The Image references may be stored in a database, such as database 140, and/or in some other location. The images may be stored in one or more shared data stores that are local to the network(s) on which the image will be deployed. According to one embodiment, each Image includes a virtual machine (VM) role type that specifies the type of VM it can deploy, the number of processors that it should use, the amount of RAM that it will be assigned, a network ID used to find a nearby install point (so they don't get copied repeatedly over the cross data-center links) and a share path that the deployment code can use to access the VHD.

Generally, machines in the networks being managed by cloud system 100 are not upgraded in the traditional manner by downloading data and incorporating the data into the existing software on the machine. Instead, machines are updated by replacing a VHD with an updated VHD. For example, when a new version of software is needed by a farm, a new farm is deployed that has the new version installed. When the new farm is deployed, the tenants are moved from the old farm to the new farm. In this way, downtime due to an upgrade is minimized and each machine in the farm has a same version that have been tested. When a virtual machine needs to be upgraded, the VM on the machine may be deleted and replaced with the VM that is configured to run the desired service.

While upgrades to existing software are not optimal, some servers within the networks do utilize the traditional update procedure of an in-place upgrade. For example, Active Directory Domain Controllers are upgraded by updating the current software on the server without completely replacing an image on the machine. The cloud manager may also be upgraded in place in some instances.

According to one embodiment, the cloud manager includes a logging system that is configured to record a log entry for each web service call. A logging system may be implemented that includes as few/many features as desired.

Replay manager 26 is configured to resubmit jobs to a secondary network. When a fail-over event occurs, the jobs at the primary location of a service within a period of time before and/or after a fail-over event are determined by replay manager 26 and are resubmitted at a secondary location of the service. For example, jobs submitted to Network 1 fifteen minutes before the fail-over event and any jobs that are submitted to the primary network before the fail-over to the secondary network is completed are resubmitted at the secondary location. After the fail-over event occurs, replay manager 26 informs the jobs that the secondary network is taking the place of the primary network.

Replay manager 26 is also configured to maintain a mapping table 114. Mapping table 114 comprises a mapping of job input parameters, such as identifiers and/or secrets, that are associated with the primary network to the secondary network. For example, there are mappings between databases, farms and networks that are associated with a primary location of a service (e.g. Primary Network 1 and 2) to the corresponding databases, farms and networks that are associated with a secondary location of a service (e.g. Secondary Network 1 and 2).

Figure 2:
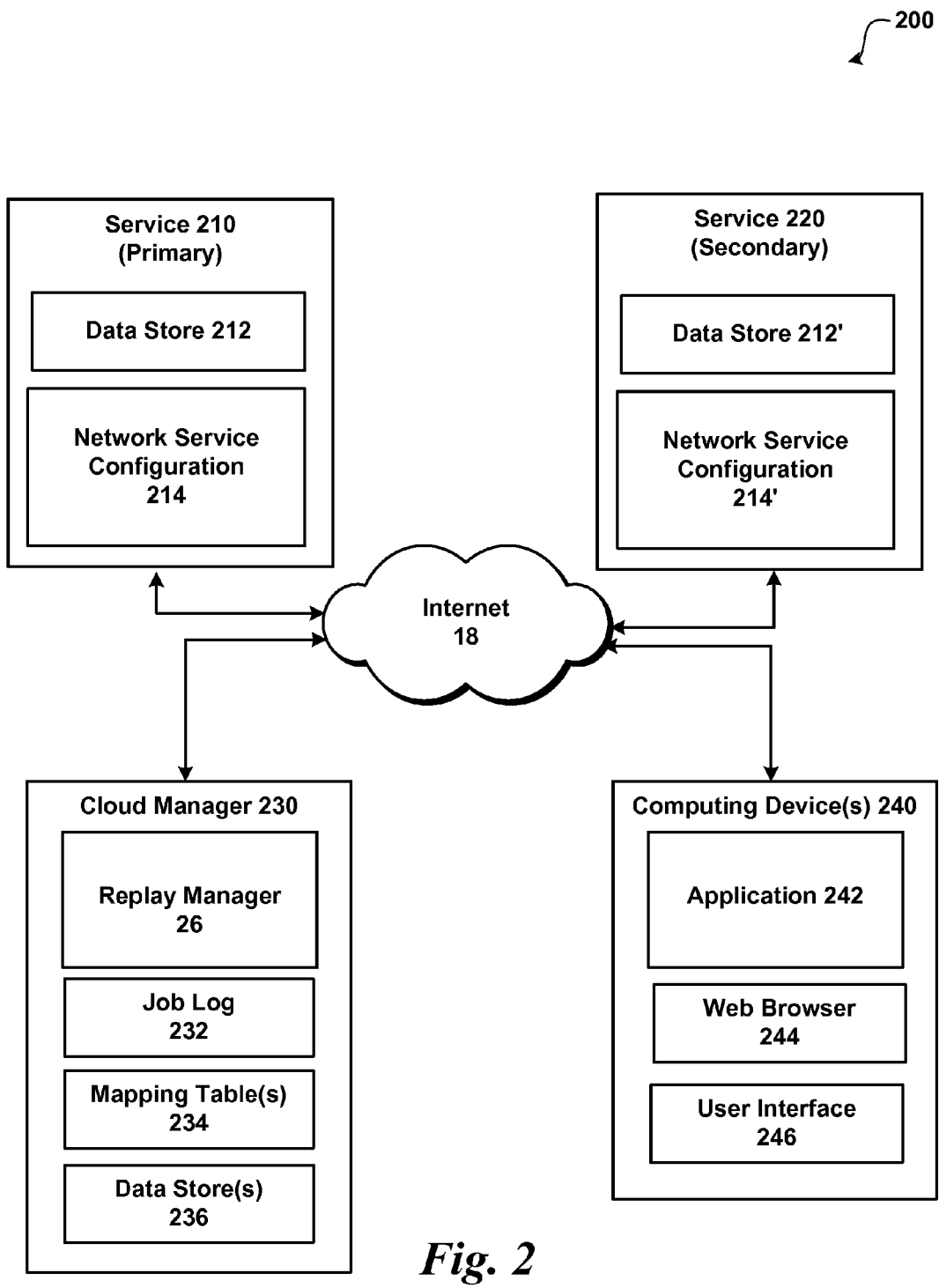
FIG. 2 shows a system for replaying jobs at a secondary location of a service.

According to an embodiment, each job determines what changes are to be made to the job request to the secondary network that is based on the fail-over event occurring at the primary location. For example, some jobs may determine that they do not need to be re-submitted while other jobs may simply resubmit the same job to the secondary location FIG. 2 shows a system for replaying jobs at a secondary location of a service. As illustrated, system 200 includes primary service 210, secondary service 220, cloud manager 230 and computing device(s) 240.

The computing devices used may be any type of computing device that is configured to perform the operations relating to the use of the computing device. For example, some of the computing devices may be: mobile computing devices (e.g. cellular phones, tablets, smart phones, laptops, and the like); some may be desktop computing devices and other computing devices may be configured as servers. Some computing devices may be arranged to provide an online cloud based service (e.g. service 210 and service 220), some may be arranged as data shares that provide data storage services, some may be arranged in local networks, some may be arranged in networks accessible through the Internet, and the like.

The computing devices are coupled through Internet 18. Generally, Internet 18 is used to transmit data between computing devices, such as service 210, service 220, cloud manager 230 and computing device(s) 240.

Computing device(s) 240 includes application 242, Web browser 244 and user interface 246. As illustrated, computing device 240 is used by a user to interact with an online service, such as service 210. According to an embodiment, service 210 and 220 is a multi-tenancy service. Generally, multi-tenancy refers to the isolation of data (sometimes including backups), usage and administration between customers. In other words, data from one customer (tenant 1) is not accessible by another customer (tenant 2) even though the data from each of the tenants may be stored within a same database within the same data store.

User interface (UI) 246 is used to interact with various applications that may be local/non-local to computing device 240. One or more user interfaces of one or more types may be used to interact with content. For example, UI 246 may include the use of a context menu, a menu within a menu bar, a menu item selected from a ribbon user interface, a graphical menu, and the like. Generally, UI 246 is configured such that a user may easily interact with functionality of an application. For example, a user may simply select an option within UI 246 to submit a job to cloud manager 230.

As illustrated, data stores 212 and 212' include tenant data, including corresponding backup data, for different tenants. A data store may store all/portion of a tenant's data. For example, some tenants may use more than one data store, whereas other tenants share the data store with many other tenants. While the corresponding backup data for a tenant is illustrated within the same data store, the backup data may be stored at other locations. For example, one data store may be used to store tenant data and one or more other data stores may be used to store the corresponding backup data. Generally, the data in data store 212' is a mirror of the data in data store 212. Changes made to data that is associated with the primary service 210 (i.e. data relating to administrative changes and tenant data) is mirrored to the secondary service 220. According to an embodiment, full backups (e.g. weekly), incremental backups (e.g. hourly, daily) and transaction logs are used in maintaining the changes made. According to an embodiment, the changes made to the primary service are copied to the secondary service such that the secondary service remains substantially synchronized with the primary service (e.g. within five, ten minutes). Periodically, the data that is copied to the secondary service is verified to help ensure that the data has been correctly copied. Different methods may be used to perform the verification (e.g. checksums, hash functions, and the like). Data store 236 includes data relating to operation and/or configuration of the service (e.g. service 210, service 220). For example, data store 236 may comprise a job queue, mapping table and/or configuration database.

Service 210 is configured as a primary location for an online service that is configured to provide services relating to displaying an interacting with data from multiple tenants. Service 210 provides a shared infrastructure for multiple tenants. According to an embodiment, the service 210 is MICROSOFT'S SHAREPOINT ONLINE service. Different tenants may host their Web applications/site collections using service 210. A tenant may also use a dedicated alone or in combination with the services provided by service 210. Service 220 is configured as a secondary location for a service that is substantially a mirror of service 210.

After a fail-over event occurring at the primary service 210, each job that was previously working on the failing primary service network is re-pointed to the secondary network 220 by replay manager 26 such that the job can complete the task it was working on within the primary network. According to an embodiment, each job that is replayed at the secondary location decides the operations it performs at the secondary location. Generally, there are three categories of jobs comprising: jobs that are a no-op for the secondary network; jobs that are idempotent and can simply start from the beginning; and jobs that compute cleanup and reinstantiate themselves with the new cleaned up input parameters.

There are many different type of jobs that may be executed by a service. According to an embodiment, the types of jobs include no-op jobs, upgrade jobs, tenant provisioning, site provisioning, idempotent jobs, and data migrations jobs. No-Op jobs are types of jobs that are performing actions that are very specific to the Failing Network and, generally, their actions are not be replayed in the Secondary Network. Upgrade jobs may be a long process may trigger a roll-back of the upgrade such that the upgrade may be reliably performed. Tenant Provisioning are jobs to provision tenants. Site Provisioning jobs inspect the state of the system, set the underlying object state back to starting and retry/re-run the job from the point just prior to the fail-over event. Idempotent jobs may be re-run as the state does not change regardless of how many times the job is run. Data migration jobs may re-execute and/or check to determine if the migration has been completed.

Replay manager 26 is configured to examine the jobs within job log 232 to determine what jobs are to be replayed at the secondary network. For example, any job that has been sent to the primary location but has not executed is selected to be replayed at the secondary network. Jobs that have targeted the primary location within a predetermined time of the fail-over event (e.g. five minutes, ten minutes, fifteen minutes, thirty minutes, one hour . . . ) are also selected to be replayed. According to an embodiment, the time of the fail-over event is determined using the Coordinated Universal Time (UTC) such that each network refers to a same time.

Replay manager 26 is configured to include a fail-over flag in a replayed job at the secondary location that identifies that the job is being re-submitted due to a fail-over event. Using the fail-over flag, the job can determine the actions to perform in response to the fail-over event. For example, in response to an examination of the fail-over flag, the job may remap any parameters that were specific to the primary network parameters to the new secondary network. According to an embodiment, a job may make a call to the cloud manager to determine the new mapping information. For example, replay manager 26 may access mapping table 234 to determine the parameters (e.g. database, farm and any Network IDs) that are affected by moving the job to the secondary network. A job may provide the failing network identifier and a type of parameter requested to obtain the mapping (e.g. Get-GridFailOverMapping-FailingNetworkID #-SourceId #-Type<Network|Farm|Database>). Some jobs may not examine the fail-over flag as they operate the same each time they are run.

Replay manager 26 may also update any secrets that apply to the Farms in the secondary network such that operations involving the secrets (e.g. passwords) may be performed at the secondary location.

The following is an example of a job that is being executed on the primary network before a fail-over event occurs. For purposes of discussion (and not intended to be limiting) assume that the job has the following parameters when submitted to the primary network (JobType: DeploySite; NetworkID: 12; JobData: ID=234; Secrets: 15; State: Executing; Step: 2; Fail-Over: Null). Upon fail-over, the job is placed into a suspended state by the cloud manager and is then resubmitted to the secondary network with the following information (JobType: DeploySite; NetworkID: 22; JobData: ID; Secrets: 25; State: Executing; Step: 2; Fail-over:12). As can be seen, the Network ID parameter has been updated to 22 from 12, the secrets parameter has changed from 15 to 25, and the fail-over flag has changed from NULL to 12.

Generally, when a job is resubmitted, the job performs various actions. According to an embodiment, each job that is replayed at the secondary network may check to see if a fail-over has occurred (e.g. Fail-Over !=Null). If a fail over did occur then the job perform zero or more of the following actions: kill (clear) the current job; translate the job command-line; determine the next step to execute; change the state of the underlying object; and create a new job.

Generally, the kill (clear) the current job is performed by the job when the job is very focused on interacting with the failing network and is a no-op in the secondary network. In these cases the Job performs no further actions and clears itself from the queue.

The job may translate the job command-line. According to an embodiment, each job has a unique command line. This command line contains specific IDs for databases, networks & farms. Each job may use and name different parameters (e.g. ID=12 could relate to a variety of different items).

The job may determine the next step to execute. The job may know what step it was working on prior to the failover, but there is no certainty that this work was replicated over to the secondary network before the fail-over event occurred. As such, the job may inspect the current state of the work performed up to the current job step and set the next step value accordingly. The job step may be set back by one or more steps. In some cases, the job may reset the next step back to 1 and redo the work relying on Idempotency to handle this case.

The job may change the state of the underlying object. Many jobs have implemented performance optimizations to allow the job to skip work if the object is in a specific state. In some cases (e.g. DeploySite) the state of the object is set back to a "starting" state so any optimizations are skipped. Thus the underlying object goes go through a full state transition cycle.

The job may create a new job. In many cases it may be easier for a job to simply create a new job with the translated parameters targeting the secondary network and terminate (clear) the existing job.

Replay manager 26 may also roll the synchronization point back in time. Rolling the synchronization back in time recreates all of the jobs for new tenant provisioning around the time of the disaster. This helps to ensure that new tenants created during the failover do not get into a stuck state. But it does not cover a fair amount of other work to Deploy new sites (end-user triggered) and other OPs triggered jobs. According to an embodiment, the synchronization is set back in time after the jobs have been replayed in the secondary network.

Figure 3:
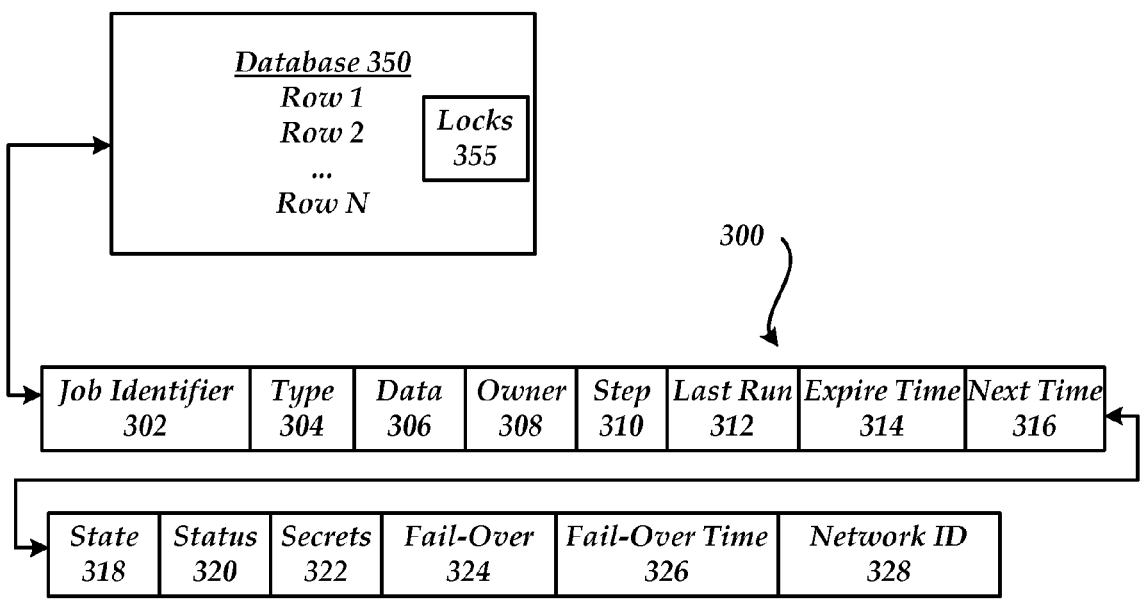
FIG. 3 illustrates an exemplary job record.

FIG. 3 shows an exemplary job record. As illustrated, record 300 comprises job identifier 302, type 304, data 306, owner 308, step 310, last run 312, expire time 314, next time 316, state 318, status 320, secrets 322, fail-over 324, fail-over time 326 and network ID 328.

Generally, for each task/job that is requested to be performed, the cloud manager creates a record in database 350 (e.g. job queue 112 in FIG. 1).

Job identifier 302 is used to specify a unique identifier for the requested task.

Type 304 specifies the task to perform. For example, the type may include a name of the script to be executed. For example, when the task is to run the script named "DeployVM.ps1" then the data 306 may include the identifier (e.g. "-VMID 123"). This allows new task types to be added to the system without requiring any changes to compiled or other binary parts of the system.

Data 306 is used to store data that is associated with the task. For example, the data may be set to the tenant, machine, network, VM, etc. on which the task is to be performed. The data 306 may also store one or more values to which a value in a database is set. The process running the task may look to the job record to see what value the desired number of machines is set to. The script uses the value in the database to perform the operation.

Owner 308 specifies a process/machine that is executing the process. For example, when a cloud manager machine starts execution of a job, the machine updates the owner 308 portion of the record with an ID of the machine.

Step 310 provides an indication of a step of the current script. For example, the script may divide a task into any number of steps. As the process completes a step of the script, step 310 is updated. A process may also look at step 310 to determine what step to execute in the script and to avoid having to re-execute previously completed steps.

Last run 312 provides a time the script was last started. Each time a script is started, the last run time is updated.

Expire time 314 is a time that indicates when the process should be terminated. According to an embodiment, the expire time is a predetermined amount of time (e.g. five minutes, ten minutes . . . ) after the process is started. The expire time may be updated by a requesting process through the web service API.

Next time 316 is a time that indicates when a task should next be executed. For example, a process may be stopped after completion of a step and be instructed to wait until the specified next time 316 to resume processing.

State 318 indicates a current state.

Status 320 indicates a status of a job (e.g. Created, Suspended, Resumed, Executing, Deleted).

Secrets 322 includes information used in performing an operation on a machine/network. For example, secrets 322 may include password information, machine information and the like.

Fail-over flag 324 indicates when a fail-over event has occurred at a network. According to an embodiment, when the fail-over flag is NULL then a failure has not occurred. When the fail-over flag is set to a Network ID then the fail-over flag identifies the failed network. This information may be used to determine any mappings that are used in the job request when it is replayed in the secondary network.

Fail-over time 326 is the time of the failure. According to an embodiment, the failure time is a UTC time.

Network ID 328 identifies the network on which the job is submitted.

Duplicate rows in the database can be removed before they are performed if they have the same task type and data values. For example, multiple requests may be made to perform the same task that are stored in multiple rows of the database.

A job can have one or more locks 355 associated with it. If locks are not available then a job will not be scheduled to run until the locks are available. The locks may be configured in many different ways. For example, the locks may be based on a mutex, a semaphore, and the like. Generally, a mutex prevents code from being executed concurrently by more than one thread and a semaphore restricts a number of simultaneous uses of a shared resource up to a maximum number. According to an embodiment, a lock is a character string that represents a resource. The resource may be any type of resource. For example, the lock may be a farm, a machine, a tenant, and the like. Generally, the locks are used to defer execution of one or more jobs. Each job may specify one or more locks that it needs before running. A job may release a lock at any time during its operation. When there is a lock, the job is not scheduled. A job needing more than one lock requests all locks required at once. For example, a job already in possession of a lock may not request additional locks. Such a scheme assists in preventing possible deadlock situations caused by circular lock dependencies amongst multiple jobs.

Different jobs may use different fields depending on the job's requirements.

Figure 4:
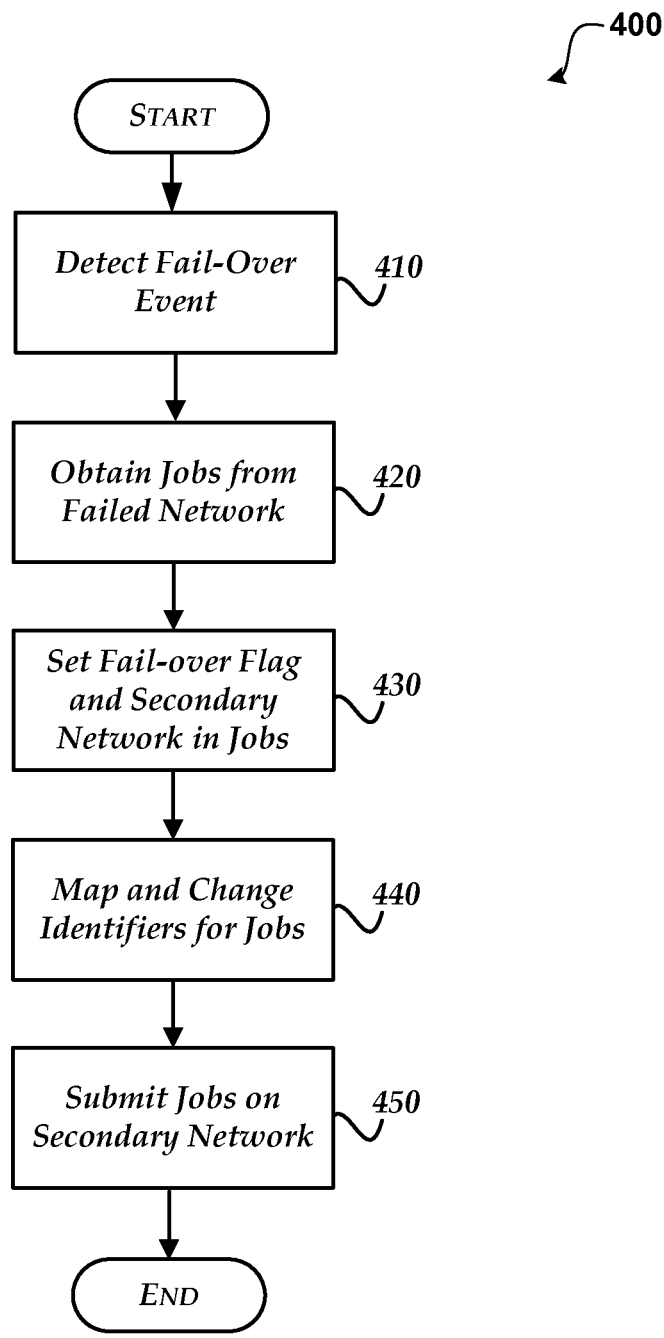
FIG. 4 shows a process for replaying jobs in a secondary network.

Referring now to FIG. 4, a process for replaying jobs in a secondary network will be described.

When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

After a start operation, the process 400 flows to operation 410, where a fail-over event is detected. The fail-over event may be detected in response to a planned/unplanned event. For example, the fail-over event may be caused by a catastrophic failure at a primary network or may be caused by a determination to stop using a primary network. The fail-over event may be initiated manually/automatically. For example, an authorized user may trigger the fail-over from the primary network to the secondary network or the fail-over may be automatically triggered based on the detection of one or more conditions (e.g. failure of one or more machines).

Flowing to operation 420, jobs to replay at the secondary network are obtained from the failed network. According to an embodiment, the jobs obtained from the primary network are include jobs that are submitted a period of time before the fail-over event (e.g. 15 minutes) and jobs submitted to the primary network until the fail-over to the secondary network is complete.

Moving to operation 430, the obtained jobs are updated to reflect the secondary network and the occurrence of the fail-over at the primary network. According to an embodiment, the job is updated with an ID of the failed network, a time of the fail-over event, an ID of the secondary network and any secrets to be used by the new job.

Transitioning to operation 440, any parameters (e.g. identifiers) that are specific to the network the job that is being executed on are updated. For example, the job may be targeting a specific database that in the primary network has an ID of 12 and in the secondary network has an ID of 26. According to an embodiment, the job submits a query to the cloud manager to receive the desired mapping information for the job.

Moving to operation 450, the jobs are submitted on the secondary network. The jobs may perform different actions when submitted on the secondary network. For example, the job may kill itself, may translate its command line parameters, determine the next steps to execute, change a state of an object, create a new job and the like. According to an embodiment, the job is started by executing a script. Executing the script may invoke a remote call to start a script and/or perform some other task on a remote machine.

The process then moves to an end operation and returns to processing other actions.

Figure 5:
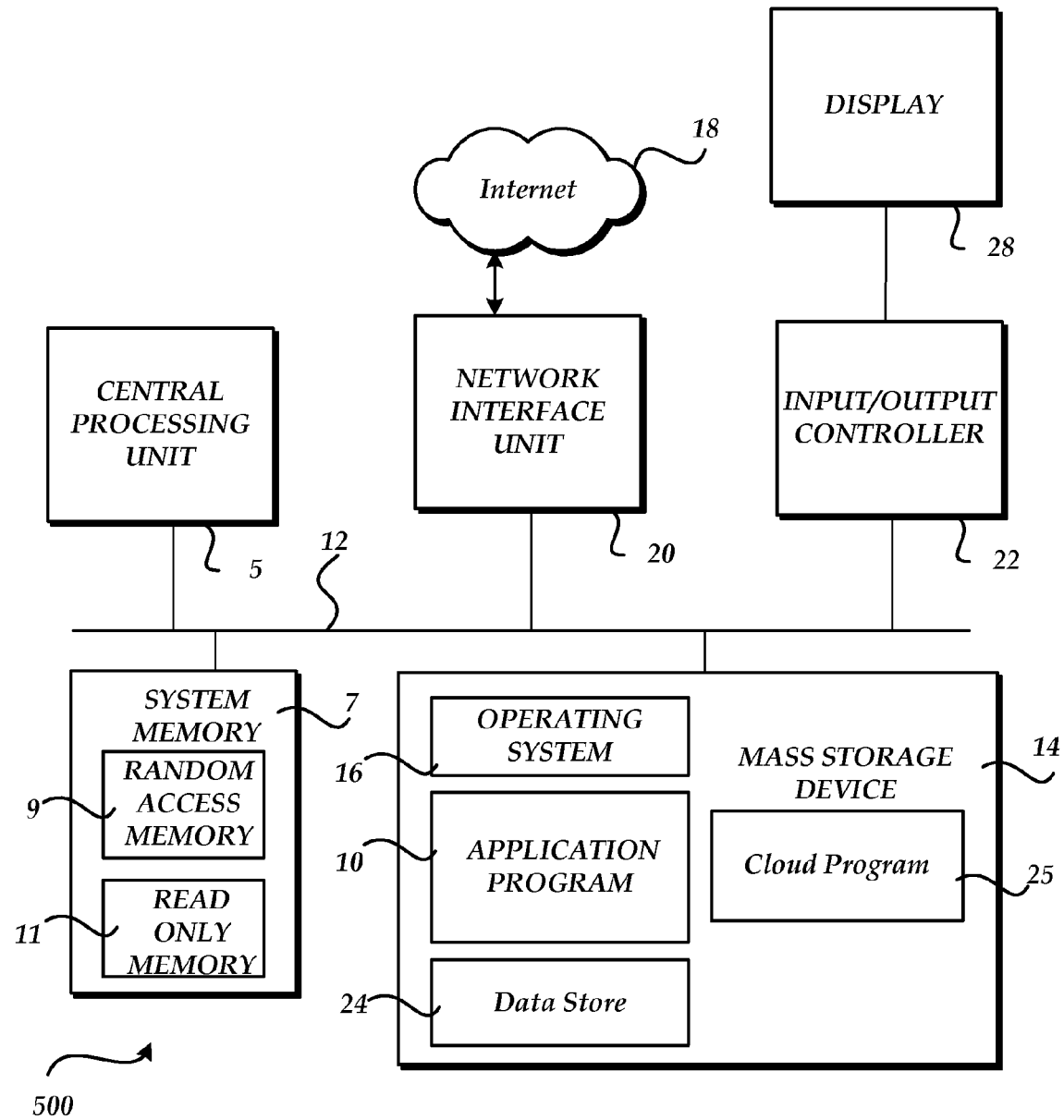
FIG. 5 shows an illustrative computer architecture.

Referring now to FIG. 5, an illustrative computer architecture for a computer 500 utilized in the various embodiments will be described. The computer architecture shown in FIG. 5 may be configured as a server, a desktop or mobile computer and includes a central processing unit 5 ("CPU"), a system memory 7, including a random access memory 9 ("RAM") and a read-only memory ("ROM") 10, and a system bus 12 that couples the memory to the central processing unit ("CPU") 5.

A basic input/output system containing the basic routines that help to transfer information between elements within the computer, such as during startup, is stored in the ROM 10. The computer 500 further includes a mass storage device 14 for storing an operating system 16, application programs 10, data store 24, files, and a cloud program 26 relating to execution of and interaction with the cloud system 100.

The mass storage device 14 is connected to the CPU 5 through a mass storage controller (not shown) connected to the bus 12. The mass storage device 14 and its associated computer-readable media provide non-volatile storage for the computer 500. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 500.

According to various embodiments, computer 500 may operate in a networked environment using logical connections to remote computers through a network, such as the Internet 18. The computer 500 may connect to the Internet 18 through a network interface unit 20 connected to the bus 12. The network connection may be wireless and/or wired. The network interface unit 20 may also be utilized to connect to other types of networks and remote computer systems. The computer 500 may also include an input/output controller 22 for receiving and processing input from a number of other devices, including a keyboard, mouse, or electronic stylus (not shown in FIG. 5). Similarly, an input/output controller 22 may provide output to a display screen 28, a printer, or other type of output device.

As mentioned briefly above, a number of program modules and data files may be stored in the mass storage device 14 and RAM 9 of the computer 500, including an operating system 16 suitable for controlling the operation of a networked computer, such as the WINDOWS® operating systems from MICROSOFT® CORPORATION of Redmond, Wash. The mass storage device 14 and RAM 9 may also store one or more program modules. In particular, the mass storage device 14 and the RAM 9 may store one or more application programs, such as cloud program 25, that perform jobs relating to the cloud system.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for replaying jobs in a network of a service, comprising:
   detecting when a fail-over event occurs for moving operations from a primary location of the service to a secondary location of the service;
   obtaining jobs from the primary location of the service;
   submitting the obtained jobs at the secondary location of the service; and
   updating the obtained jobs to comply with secondary location parameters by obtaining a mapping of primary location parameters to secondary location parameters, wherein the secondary location becomes the primary location of the service after the fail-over event.

2. The method of claim 1, wherein obtaining the jobs from the primary location of the service comprises obtaining each of the jobs submitted to the primary location within a predetermined time from the fail-over event.

3. The method of claim 2, wherein the predetermined time is within an hour of the fail-over event and wherein the jobs that are obtained include jobs submitted to the primary location of the service before and after the fail-over event.

4. The method of claim 1, wherein submitting the obtained jobs at the secondary location of the service comprises setting a fail-over flag in each of the jobs.

5. The method of claim 1, wherein each job queries a central service to determine a mapping between the primary location and the secondary location.

6. The method of claim 1, further comprising rolling back a synchronization time of the primary location a predetermined amount of time such that the primary location is re-synchronized with the secondary location.

7. The method of claim 1, wherein submitting the obtained jobs at the secondary location of the service comprises changing a network identifier of a job submitted to reflect the secondary location of the service and updating any secrets relating to the secondary location.

8. The method of claim 1, wherein submitting the obtained jobs at the secondary location of the service comprises each obtained job submitting its request.

9. A computer-readable storage medium having computer-executable instructions for replaying jobs in a network of a service, the instructions, when executed by at least one processor, causing the at least one processor to perform a method, the method comprising:
   detecting when a fail-over event occurs for moving operations from a primary location of the service to a secondary location of the service;
   obtaining jobs from the primary location of the service;
   submitting the obtained jobs at the secondary location of the service; and
   updating the obtained jobs to comply with secondary location parameters by obtaining a mapping of primary location parameters to secondary location parameters, wherein the secondary location becomes the primary location of the service after the fail-over event.

10. The computer-readable storage medium of claim 9, wherein obtaining the jobs from the primary location of the service comprises obtaining each of the jobs submitted to be executed within a predetermined time from the fail-over event.

11. The computer-readable storage medium of claim 10, wherein one or more of the submitted jobs automatically terminate in response to determining that no operations are to be performed.

12. The computer-readable storage medium of claim 9, wherein submitting the obtained jobs at the secondary location of the service comprises setting a fail-over flag in each of the jobs.

13. The computer-readable storage medium of claim 9, wherein submitting the obtained jobs at the secondary location of the service comprises each obtained job submitting its request, and wherein each obtained job submitting its request determines whether to start over at the secondary location or to compute cleanup and reinstantiate themselves with new cleaned up input parameters.

14. The computer-readable storage medium of claim 9, the method further comprising rolling back a synchronization time a predetermined amount of time.

15. A system for replaying jobs in a network of a service, comprising:
   a processor and a computer-readable medium;
   an operating environment stored on the computer-readable medium and executing on the processor; and
   a cloud manager operative to perform actions, comprising:
      detecting when a fail-over event occurs for moving operations from a primary location of the service to a secondary location of the service;
      obtaining jobs from the primary location of the service;
      submitting the obtained jobs at the secondary location of the service; and
      updating the obtained jobs to comply with secondary location parameters by obtaining a mapping of primary location parameters to secondary location parameters, wherein the secondary location becomes the primary location of the service after the fail-over event.

16. The system of claim 15, wherein obtaining the jobs from the primary location of the service comprises obtaining each of the jobs submitted to be executed within a predetermined time from the fail-over event.

17. The system of claim 15, wherein submitting the obtained jobs at the secondary location of the service comprises setting a fail-over flag in each of the jobs.

18. The system of claim 15, wherein submitting the obtained jobs at the secondary location of the service comprises each obtained job submitting its request, and wherein each obtained job submitting its request determines whether to start over at the secondary location or to compute cleanup and reinstantiate themselves with new cleaned up input parameters.

19. The system of claim 15, further comprising rolling back a synchronization time a predetermined amount of time.

20. The method of claim 8, wherein each obtained job submitting its request determines whether to start over at the secondary location or to compute cleanup and reinstantiate themselves with new cleaned up input parameters.

* * * * *